(No Model.)

F. A. MOORE & A. J. HEABERLIN.
WINDLASS.

No. 286,547. Patented Oct. 9, 1883.

WITNESSES
Chas. A. Baker
E. H. Bradford.

INVENTORS
F. A. Moore
A. J. Heaberlin
By H. J. Ennis Attorney

UNITED STATES PATENT OFFICE.

FRANCIS A. MOORE AND ANDREW J. HEABERLIN, OF DENTON, KENTUCKY, ASSIGNORS OF ONE-HALF TO JOHN J. CALVIN AND JAY F. SHUTE, OF SAME PLACE.

WINDLASS.

SPECIFICATION forming part of Letters Patent No. 286,547, dated October 9, 1883.

Application filed August 29, 1883. (No model.)

*To all whom it may concern:*

Be it known that we, FRANCIS A. MOORE and ANDREW J. HEABERLIN, citizens of the United States, residing at Denton, in the county of Carter and State of Kentucky, have invented certain new and useful Improvements in Windlasses, of which the following is a specification, reference being had therein to the accompanying drawings.

Our invention has relation to levers for operating windlasses, and is an improvement upon Letters Patent No. 281,910, granted to us for the same purpose; and the object is to provide an improved lever for operating devices of this kind which can be instantly attached to shafts of different diameters, and whereby the cylinder or drum can be rotated in either direction with facility; and the novelty consists in the construction of the lever, as will be hereinafter more fully described, and particularly set forth in the claims.

In the accompanying drawings, similar letters of reference indicate the same parts of the invention.

Figure 1:
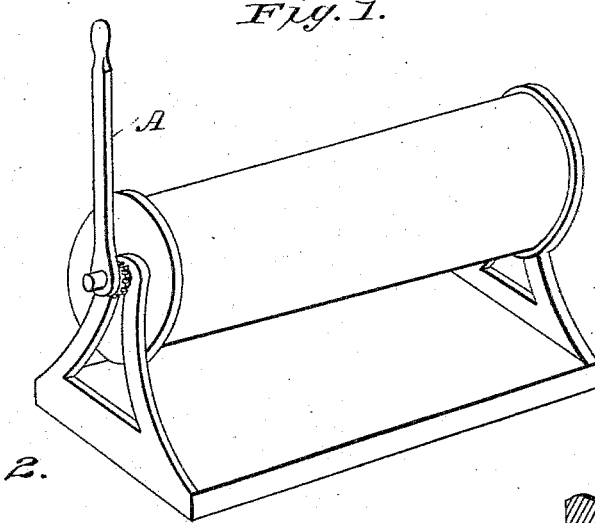
Figure 2:
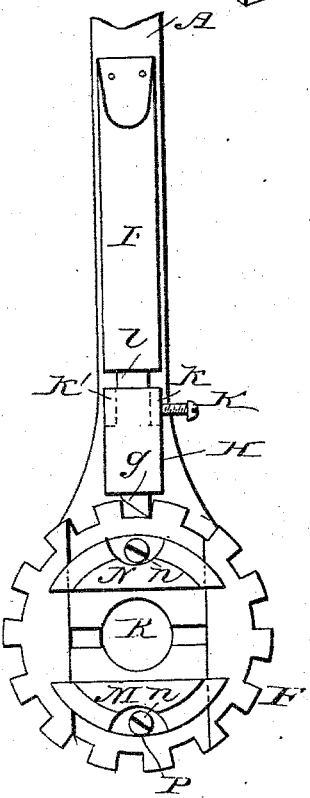
Figure 3:
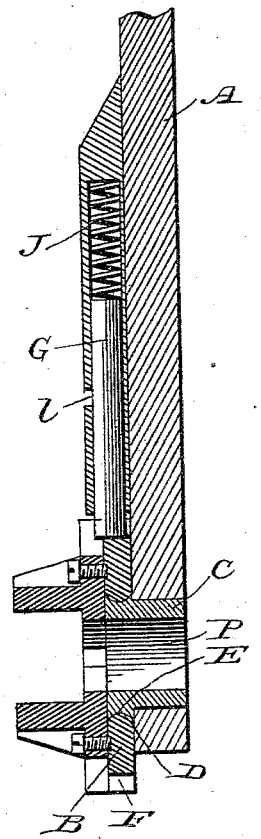

Figure 1 is a perspective elevation of a windlass having our improved lever attached thereto. Fig. 2 is a front plan of the lever detached, and Fig. 3 a longitudinal section of the same.

A is the operating-handle of the lever, and may be of any desired length.

B is a hub secured to the head C of the handle A, and is provided with a circular groove-bearing, D, rotating in either direction freely in groove E in head C. The periphery of this head C is provided with square teeth F; and G is a spring-dog secured in the guides H I, attached to the handle. The bevel-face $g$ of this dog engages the teeth F, and a spiral spring, J, keeps the dog in contact with them. The dog is provided with a handle, K, which works in guide-slots $k\ k'$ in the guide H. When the drum is to be rotated to the right, the handle K is set in the guide-slot $k$, as shown in Fig. 2. If the drum is to be turned to the left, the handle K is pressed up, passing through the cross-slot $l$ and dropped in the guide-slot $k'$. This reverses the bevel-face of the dog. When it is desirable to run the drum down without the use of the handle, the dog is turned so its handle rests in the cross-slot $l$, which holds said dog clear of the teeth F.

P is a groove in the face of the head C, and it is provided with two jaws, M and N, each provided with a set-screw, $n$, by means of which they can be radially adjusted to or from the center.

R is a central hole in the hub B, through which the end of the drum-shaft projects.

Having thus described our invention, what we claim is—

1. The combination, with the drum or cylinder, of the lever A, head C, hub B, and dog G, as set forth.

2. The handle or lever A, head C, hub B, having teeth F, and movable jaws M N, in combination with the guides H I, dog G, spring J, and handle K, as set forth.

3. The handle or lever A, having head C, and guides H I, provided with slot-guides $k$, $k'$, and $l$, in combination with the hub B, having slot P, and jaws M N, provided with set-screws $m\ n$, and the dog G, handle K, and spring J, as set forth.

In testimony whereof we affix our signatures in presence of two witnesses.

FRANCIS A. MOORE.
ANDREW J. HEABERLIN.

Witnesses:
JOHN J. CALVIN,
WM. E. CASSIDY.